(12) United States Patent
Jiang

(10) Patent No.: US 12,415,131 B2
(45) Date of Patent: Sep. 16, 2025

(54) IN-GAME AIMING CONTROL METHOD AND APPARATUS, AND ELECTRONIC TERMINAL

(71) Applicant: NETEASE (HANGZHOU) NETWORK CO., LTD., Zhejiang (CN)

(72) Inventor: Nan Jiang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 38 days.

(21) Appl. No.: 18/259,008

(22) PCT Filed: Jun. 9, 2022

(86) PCT No.: PCT/CN2022/097796
§ 371 (c)(1),
(2) Date: Jun. 22, 2023

(87) PCT Pub. No.: WO2023/016074
PCT Pub. Date: Feb. 16, 2023

(65) Prior Publication Data
US 2024/0042316 A1 Feb. 8, 2024

(30) Foreign Application Priority Data
Aug. 12, 2021 (CN) .......................... 202110925101.X

(51) Int. Cl.
*A63F 13/53* (2014.01)
*A63F 13/2145* (2014.01)
(Continued)

(52) U.S. Cl.
CPC .......... *A63F 13/53* (2014.09); *A63F 13/2145* (2014.09); *A63F 13/44* (2014.09);
(Continued)

(58) Field of Classification Search
CPC ............................... A63F 13/53; A63F 13/837
See application file for complete search history.

(56) References Cited

U.S. PATENT DOCUMENTS

2004/0009798 A1* 1/2004 Okuda .................. A63F 13/843
463/7
2007/0021210 A1* 1/2007 Tachibana ............. A63F 13/245
463/37
(Continued)

FOREIGN PATENT DOCUMENTS

CN 105498213 A 4/2016
CN 107913515 A 4/2018
(Continued)

OTHER PUBLICATIONS

International Search Report for the International Application No. PCT/CN2022/097796 issued by the International Searching Authority on Aug. 31, 2022.
(Continued)

*Primary Examiner* — James S. McClellan
(74) *Attorney, Agent, or Firm* — IP & T GROUP LLP

(57) ABSTRACT

An in-game aiming control method and apparatus, and an electronic terminal are provided. The method includes: in response to an adjustment operation for a reticle, controlling adjustment of an aiming direction of a virtual weapon in a game scene; and in response to an angle between the aiming direction and a direction in which a target virtual object is located being less than or equal to a preset angle, controlling a scope of the virtual weapon to be turned on, and amplifying and displaying game content determined by the scope.

19 Claims, 6 Drawing Sheets

(51) Int. Cl.
*A63F 13/44* (2014.01)
*A63F 13/837* (2014.01)
*G06F 3/0485* (2022.01)
*G06F 3/0488* (2022.01)

(52) U.S. Cl.
CPC .......... *A63F 13/837* (2014.09); *G06F 3/0485* (2013.01); *G06F 3/0488* (2013.01)

(56) References Cited

U.S. PATENT DOCUMENTS

| | | | | |
|---|---|---|---|---|
| 2010/0009733 | A1* | 1/2010 | Garvin | A63F 13/10 463/37 |
| 2014/0243058 | A1* | 8/2014 | Tsuchiya | A63F 13/426 463/2 |
| 2015/0157940 | A1* | 6/2015 | Hall | A63F 13/5372 463/31 |
| 2015/0231509 | A1* | 8/2015 | McMain, II | A63F 13/837 463/31 |
| 2020/0016486 | A1* | 1/2020 | Minamino | G06F 3/033 |
| 2020/0054947 | A1* | 2/2020 | Wu | A63F 13/537 |
| 2020/0368616 | A1 | 11/2020 | Delamont | |

FOREIGN PATENT DOCUMENTS

| | | |
|---|---|---|
| CN | 108854063 A | 11/2018 |
| CN | 112221134 A | 1/2021 |

OTHER PUBLICATIONS

Written Opinion for the International Application No. PCT/CN2022/097796 issued by the International Searching Authority on Aug. 31, 2022.

* cited by examiner

IN-GAME AIMING CONTROL METHOD AND APPARATUS, AND ELECTRONIC TERMINAL

CROSS-REFERENCE TO RELATED APPLICATIONS

The present disclosure is the national phase application of POT International Application No. PCT/CN2022/097796, filed on Jun. 9, 2022, which is based upon and claims the priority to the Chinese patent application No. 202110925101.X filed on Aug. 12, 2021, the entire contents of both of which are incorporated herein by reference for all purposes.

TECHNICAL FIELD

The present disclosure relates to the technical field of games, and in particular, to an in-game aiming control method, an apparatus (i.e., a device), and electronic terminal.

BACKGROUND ART

In shooting games or the like, the players often need to perform an aiming operation on a to-be-attacked target and then perform a shooting operation. However, if the aiming judgment is wrong, the to-be-attacked target cannot be hit. For example, when the to-be-attacked target is relatively far away, the size of the to-be-attacked target displayed in a graphical user interface is relatively small, and it is difficult or the players to perform precise aiming judgment.

At present, the players can realize the precise aiming operation by means of a telescopic sight (sighting telescope), so as to improve the hit rate of the to-be-shot target. However, the use of the telescopic sight increases the operation burden of the players, and the cost for the players to perform the precise aiming operation in the game is relatively large.

SUMMARY

The first aspect of the present disclosure provides an in-game aiming control method, including: in response to detecting an adjustment operation on a crosshair of a virtual weapon, adjusting an aiming direction of the virtual weapon in a game scene, where a graphical user interface is provided by a terminal, the graphical user interface displays the crosshair of the virtual weapon and a target virtual object located in the game scene, and the crosshair is configured to prompt the aiming direction of the virtual weapon in the game scene; and in response to determining that an angle between the aiming direction and a direction in which the target virtual object is located is smaller than or equal to a preset angle, turning on a telescopic sight of the virtual weapon, and magnifying and displaying game contents determined through the telescopic sight.

The second aspect of the present disclosure provides an electronic terminal, including a display screen, a memory and a processor, the memory storing instructions executable by the processor, where the display screen is configured to display a graphical user interface, and where the processor is configured to: in response to detecting an adjustment operation on a crosshair of a virtual weapon, adjust an aiming direction of the virtual weapon in a game scene, where the graphical user interface displays the crosshair of the virtual weapon and a target virtual object located in the game scene, and the crosshair is configured to prompt the aiming direction of the virtual weapon in the game scene; and in response to determining that an angle between the aiming direction and a direction in which the target virtual object is located is smaller than or equal to a preset angle, turn on a telescopic sight of the virtual weapon, and magnify and display game contents determined through the telescopic sight.

The third aspect of the present disclosure provides a non-transitory computer-readable storage medium, where the non-transitory computer-readable storage medium stores computer-executable instructions, when the computer-executable instructions are invoked and executed by a processor, the computer-executable instructions cause the processor to execute an in-game aiming control method, including: in response to detecting an adjustment operation on a crosshair of a virtual weapon, adjusting an aiming direction of the virtual weapon in a game scene, where a graphical user interface is provided by a terminal, the graphical user interface displays the crosshair of the virtual weapon and a target virtual object located in the game scene, and the crosshair is configured to prompt the aiming direction of the virtual weapon in the game scene; and in response to determining that an angle between the aiming direction and a direction in which the target virtual object is located is smaller than or equal to a preset angle, turning on a telescopic sight of the virtual weapon, and magnifying and displaying game contents determined through the telescopic sight.

BRIEF DESCRIPTION OF DRAWINGS

In order to more clearly illustrate technical solutions in specific embodiments of the present disclosure or the prior art, drawings which need to be used in the description of the specific embodiments or the prior art will be introduced briefly below. Apparently, the drawings in the description below merely show some embodiments of the present disclosure, and those ordinarily skilled in the art still could obtain other drawings in light of these drawings, without using creative efforts.

DETAILED DESCRIPTION

Figure 1:
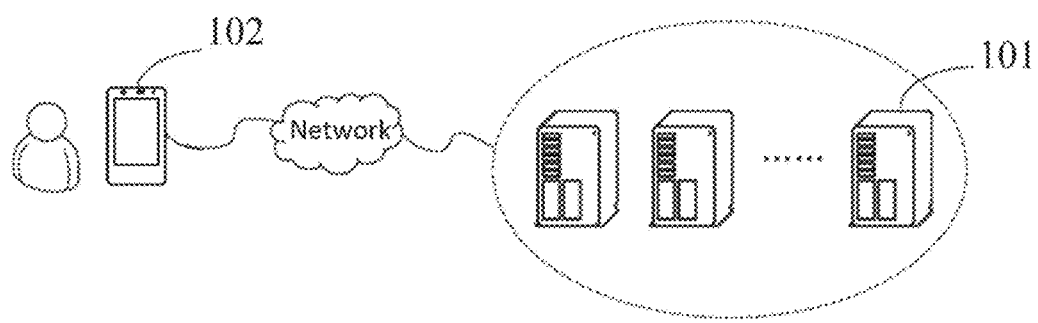
FIG. 1 is a schematic view of an application scenario provided in one of the embodiments of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Currently, a shooting mode named "automatic firing" exists in the games. When the gun crosshair aims at an attackable target, the system determines to automatically shoot, thus reducing the operation of "shooting". In this shooting mode, the player only needs to focus on two operations of "moving" and "aiming" and move the gun crosshair onto the attackable target. However, for such existing shooting mode, when the attackable target is relatively far away, the size displayed in the graphical user interface is relatively small. It is difficult for the player to perform precise aiming judgment. Since automatic firing itself needs precise aiming judgment, a case in which it is difficult to aim a target to make the automatic firing achieved may easily occur, which greatly affects the shooting experience. The manual turning on of the telescopic sight increases the operation burden of the player, which results in a relatively large cost for the player to perform the precise aiming operation.

Based on this, the present disclosure provides an in-game aiming control method, device, and electronic terminal. This method may solve the technical problem that the cost for the players to perform the precise aiming operation in the game is relatively large.

The in-game aiming control method in an embodiment of the present disclosure may run on a local electronic terminal or a server. When the in-game aiming control method runs on a server, this method can be realized and executed based on a cloud interaction system, where the cloud interaction system includes the server and a client device.

In one embodiment, the cloud interaction system may run various cloud applications, for example, a cloud game. Taking the cloud game as an example, the cloud game refers to a cloud computation-based game mode. In a running mode of the cloud game, a running subject of a game program and a game screen presentation subject are separated, storage and running of the in-game aiming control method are completed on a cloud game server, a client device functions to receive and transmit data and present the game screen, for example, the client device may be a display device with a data transmission function close to a user side, e.g., a mobile terminal, a television, a computer, a handheld computer, etc.; however, the terminal device that performs information processing is the cloud game server in the cloud. When playing, the player operates the client device to send an operation instruction to the cloud game server, the cloud game server runs the game according to the operation instruction, encodes and compresses data such as the game screen, and returns the same to the client device via network, and finally, the client device decodes and outputs the game screen.

In one embodiment, the electronic terminal may be a local electronic terminal. Taking a game as an example, the local electronic terminal stores a game program and is configured to present a game screen. The local electronic terminal is configured to interact with a player via a graphical user interface, i.e., conventionally downloading and installing the game program and running the same through electronic device. The local electronic terminal can provide the graphical user interface to the player in various manners. For example, the graphical user interface may be rendered on a display screen of the terminal, or may be provided to the player by means of holographical projection. For example, the local electronic terminal may include a display screen and a processor, where the display screen is configured to present the graphical user interface, the graphical user interface includes the game screen, and the processor is configured to run the game, generate the graphical user interface, and control the display of the graphical user interface on the display screen.

In one embodiment, an example of the present disclosure provides an in-game aiming control method, and the graphical user interface is provided by a first terminal, where the first terminal may be the local electronic terminal mentioned in the preceding, and also may be the client device in the cloud interaction system mentioned in the preceding.

In one embodiment, an example of the present disclosure provides an electronic terminal. In the above, the electronic terminal includes a touch screen and a processor, and the touch screen is used for presenting a graphical user interface and receiving operations for the graphical user interface.

For example, as shown in FIG. 1, FIG. 1 is a schematic diagram of an application scenario provided in an embodiment of the present disclosure. The application scenario may include an electronic terminal (e.g., a mobile phone 102) and a server 101, and the electronic terminal may communicate with the server 101 through a wired network or a wireless network. In the above, the electronic terminal is used for running a virtual desktop, and through the virtual desktop, the electronic terminal can interact with the server 101 so as to realize control over virtual weapons in the server 101.

Figure 2:
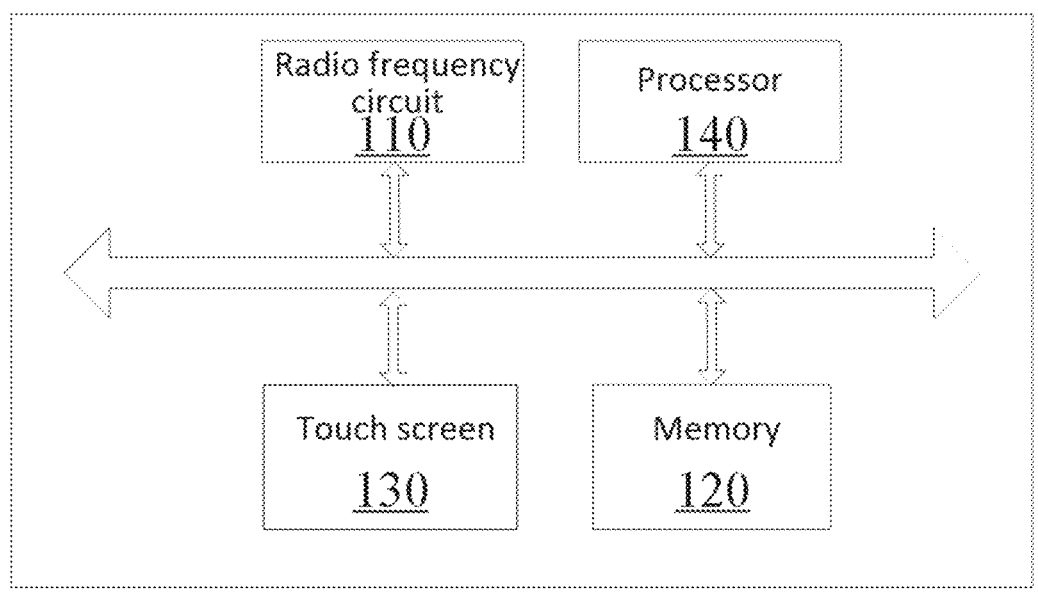
FIG. 2 shows a structural schematic view of a mobile phone provided in one of the embodiments of the present disclosure.

The electronic terminal in the present embodiment is described by taking the mobile phone 102 as an example. The mobile phone 102 includes a radio frequency (RF) circuit 110, a memory 120, a touch screen 130, a processor 140 and other components. Those skilled in the art could understand that, the structure of the mobile phone shown in FIG. 2 does not constitute a limitation to the mobile phone, and may include more or less components than those shown in the drawing, or is combined with some components, or is split into some components, or is in different component arrangements. Those skilled in the art could understand that the touch screen 130 belongs to a user interface (UI), and the mobile phone 102 may include more or less user interfaces than those shown in the drawing.

The RF circuit 110 further may communicate with the network or other devices via wireless communication. The wireless communication can use any communication standard or protocol, including but not limited to global system of mobile communication (GSM), general packet radio service (CPRS), code division multiple access (CDMA), wideband code division multiple access (WCDMA), long term evolution (LTE), E-mail, and short messaging service (SMS), etc.

The memory 120 can be used to store software programs and modules, and the processor 140 executes various functional applications and data processing of the mobile phone 102 by running the software programs and modules stored in the memory 120. The memory 120 may mainly include a program storing area and a data storing area, where the program storing area may store an operating system, an application program required for at least one function and the like; and the data storing area may store data, etc., created according to the usage of the mobile phone 102. In addition, the memory 120 may include high-speed random access memory, and also may include non-volatile memory, such as at least one magnetic disk storage device, flash memory device, or other volatile solid state storage device.

Figure 3:
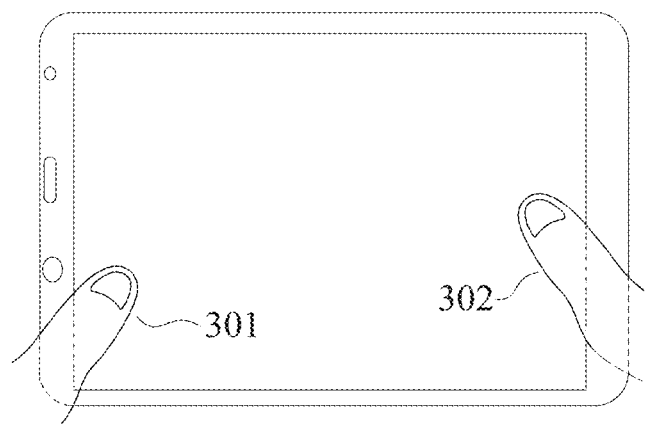
FIG. 3 is a schematic view of a use scenario of an electronic terminal provided in one of the embodiments of the present disclosure.

The touch screen 130 may be used to display a graphical user interface and receive user operations on the graphical user interface. A specific touch screen 130 may include a display panel and a touch panel. In the above, the display panel may be configured in the form of liquid crystal display (LCD), and organic light-emitting diode (OLED) and the like. The touch panel can collect the user's contact or non-contact operations on or near it (for example, as shown in FIG. 3, the user operations on or near the touch panel using any suitable object or accessory such as a finger 301, a stylus, etc.), and generate preset operation instructions set in advance. In addition, the touch panel may include two parts, i.e., a touch detection device and a touch controller, where the touch detection device detects user's touch orientation and posture, detects a signal brought by the touch operation, and transmits the signal to the touch controller; and the touch controller receives the touch information from the touch detection device, converts it into information that can be processed by the processor and then sends it to the processor 140, and can receive a command sent by the processor 140 and execute the same. Furthermore, the touch panel can be realized in various types such as resistance type, capacitive type, infrared, and surface acoustic wave, or any technology developed in the future can be also used to realize the touch panel. Further, the touch panel can cover the display panel, and the user can operate on or near the touch panel covered on the display panel according to the graphical user interface displayed on the display panel. After detecting an operation on or near the touch panel, the touch panel transmits the operation to the processor 140 to determine a user input, and the processor 140 subsequently provides corresponding visual output on the display panel in response to the user input. In addition, the touch panel and the display panel can be implemented as two independent components or can be integrated.

The processor 140 is a control center of the mobile phone 102, which connects various parts of the entire mobile phone using various interfaces and lines, and executes various functions of the mobile phone 102 and processes data by running or executing the software programs and/or modules stored in the memory 120, and invoking the data stored in the memory 120, so as to monitor the mobile phone as a whole.

The embodiments of the present disclosure are further introduced below in conjunction with drawings.

Figure 4:
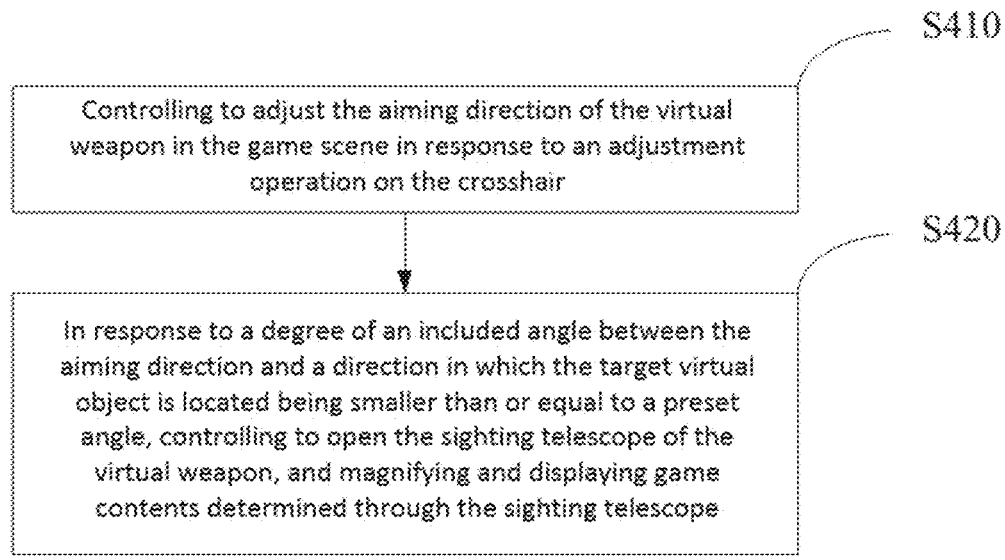
FIG. 4 is a schematic flowchart of an in-game aiming control method provided in one of the embodiments of the present disclosure.

FIG. 4 is a schematic flowchart of an in-game aiming control method provided in an embodiment of the present disclosure. The method can be applied to a first terminal (for example, a mobile phone 102 shown in FIG. 2) that can present a graphical user interface, the graphical user interface is provided by the first terminal, and at least a crosshair of a virtual weapon and a target virtual object located in a game scene of a game are displayed in the graphical user interface, where the crosshair is configured to prompt an aiming direction of the virtual weapon in the game scene. As shown in FIG. 4, the method includes following steps.

Step S410, controlling to adjust the aiming direction of the virtual weapon in the game scene in response to an adjustment operation on the crosshair.

The virtual weapon in the embodiments of the present disclosure may be any weapon that can be used in a game, for example, a virtual slingshot, a virtual pistol, a virtual rifle, a virtual sniper rifle with a telescopic sight, etc. (in the present embodiment, the virtual sniper rifle is taken as an example for description). The target virtual object may include, but is not limited to, a static article, a dynamic article, and other virtual characters in the game scene (in the present embodiment, an enemy virtual character is taken as an example for description).

For the crosshair in the embodiments of the present disclosure, it should be noted that a display position of the crosshair may be a central position of the display screen in general shooting game, and the player can adjust the aiming direction by controlling movement of a visual angle direction of his/her own virtual character, i.e., a visual angle direction of character.

Figure 5:
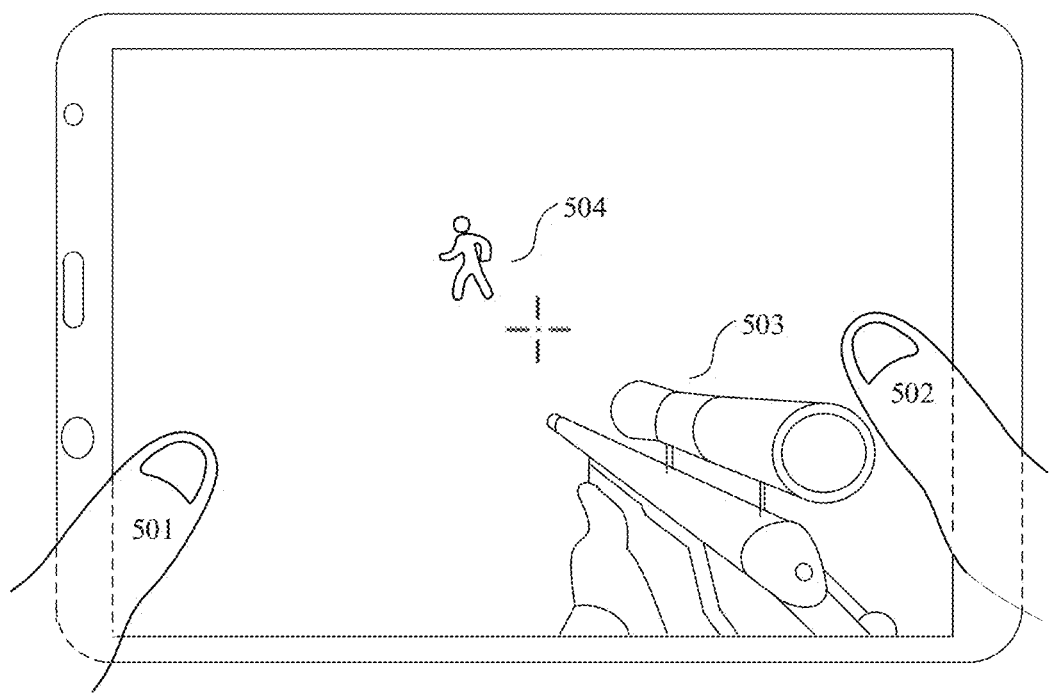
FIG. 5 is a schematic view of an electronic terminal displaying a graphical user interface provided in one of the embodiments of the present disclosure.

In one embodiment, as shown in FIG. 5, the player can perform a moving operation with one hand 501 on a left side of the screen, and while performing the moving operation, can perform an adjustment operation on the crosshair with the other hand 502 on a right side of the screen. Through the combination of the moving operation and the adjustment operation on the crosshair, the aiming direction of the virtual weapon 503 in the game scene can be flexibly controlled, so that the aiming direction of the virtual weapon 503 approaches a target virtual object 504, i.e., an enemy character.

Step S420, in response to a degree of an included angle between the aiming direction and a direction in which the target virtual object is located being smaller than or equal to a preset angle, controlling to turn on the telescopic sight of the virtual weapon, and zooming in, magnifying and displaying game contents determined through the telescopic sight.

In the above, a specific value of the preset angle may not be limited, for example, 5 degrees or 10 degrees (in the present embodiment, 5 degrees is used as an example for description). Exemplarily, when the degree of the included angle between the aiming direction of the virtual weapon and the direction in which the target virtual object is located is smaller than or equal to degrees (the preset angle), it is confirmed that the virtual weapon enters a range of turning on the telescopic sight. Then the system controls the telescopic sight of the virtual weapon to be turned on in the game scene, and zooms in, magnifies and displays the game contents determined through the telescopic sight.

Figure 6:
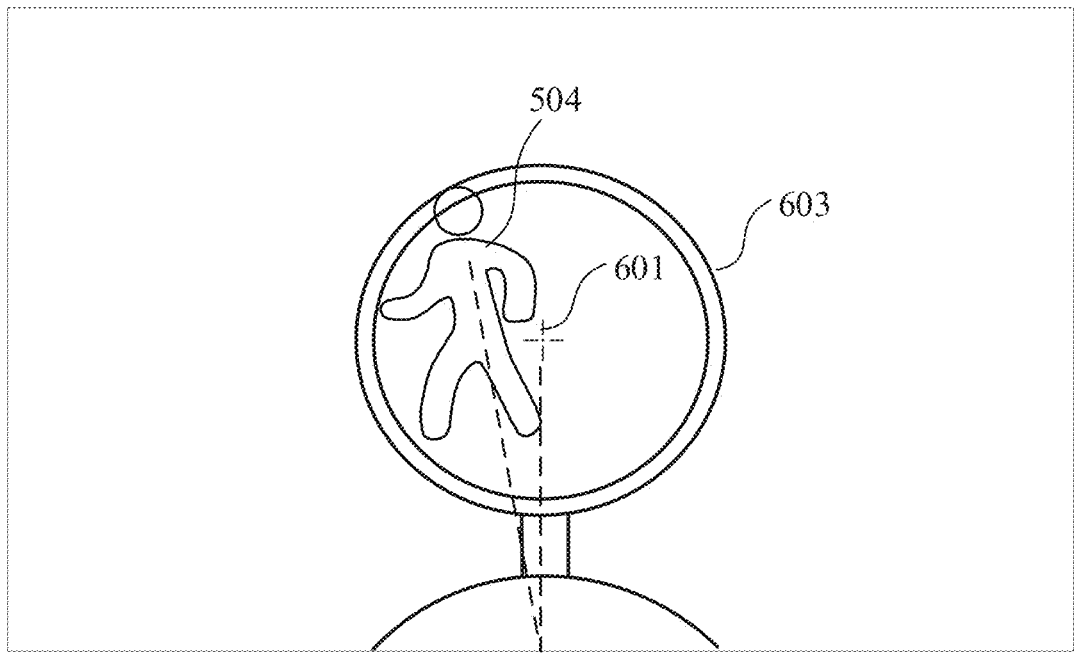
FIG. 6 is a schematic view of another electronic terminal displaying the graphical user interface provided in one of the embodiments of the present disclosure.
Figure 7:
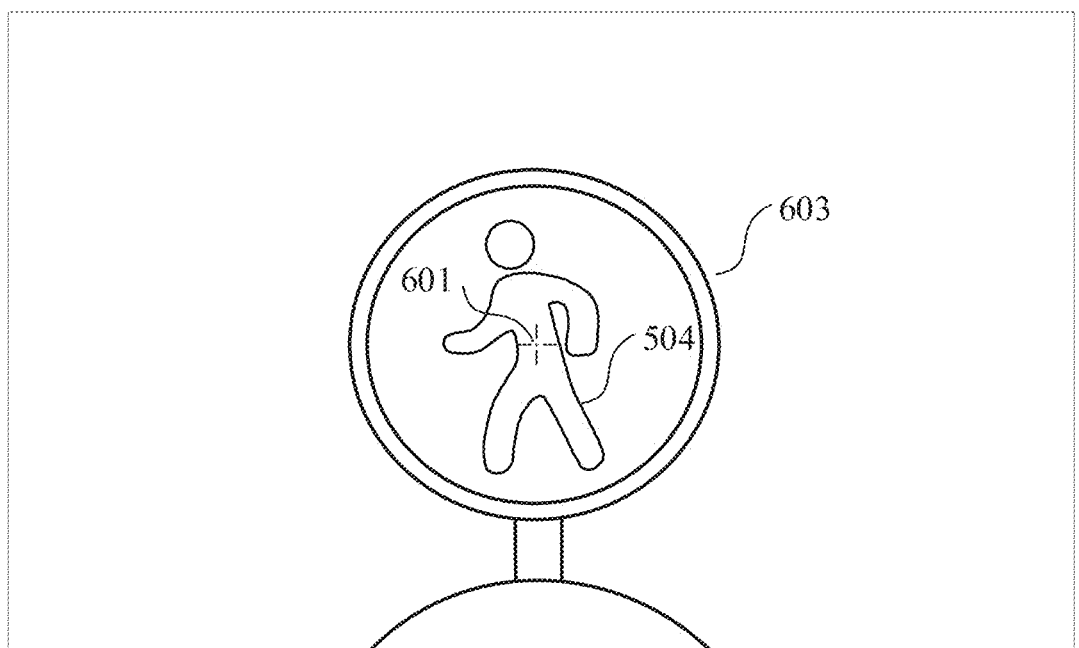
FIG. 7 is a schematic view of another electronic terminal displaying the graphical user interface provided in one of the embodiments of the present disclosure.

For example, subsequent to the player controlling the aiming direction of the virtual weapon 503 to approach the target virtual object 504 in FIG. 5, as shown in FIG. 6, when the included angle between the aiming direction of a crosshair 601 of the sniper gun and a direction in which the enemy character 602 is located is smaller than or equal to 5 degrees, the system will control the telescopic sight 603 of the sniper gun to automatically turn on, and magnify and display the game contents determined through the telescopic sight 603. The displayed game contents may include therein the target virtual object 504 or not include the target virtual object 504. For example, if a relatively large trigger angle (preset angle) is set, the target virtual object, i.e., the enemy, may not be seen from the telescopic sight.

It should be noted that, magnifying and displaying the game contents determined through the telescopic sight in the above not only is magnifying the game contents inside the telescopic sight in a narrow sense, but also can include the case where the game contents nearby or even of the whole game screen are magnified, that is, the whole game screen is magnified and displayed, after turning on the telescopic sight of the weapon.

In the embodiments of the present disclosure, by automatically turning on the telescopic sight when the degree of the included angle between the aiming direction and the direction in which the to-be-attacked target is located is small enough, the player performs more precise observation and aiming judgment by means of the magnification function of the telescopic sight, and no additional operations of the player are required, which is realized that the operation burden of the player can be reduced while satisfying precise aiming judgment, and the technical problem of relatively large cost for the player to perform the precise aiming operation in the game may be solved.

The above steps are introduced in detail below.

In some embodiments, for the game contents magnified in the telescopic sight, it is possible to magnify and display the game contents taking the telescopic sight as a target, it is also possible to magnify and display the game contents by taking the crosshair as a target, and of course, it is also possible to magnify the whole game screen. As an example, the game contents determined through the telescopic sight include any one of the following:

a game screen in a mirror frame of the telescopic sight, a game screen within a preset range centering on the crosshair, and the whole game screen of the game.

In the embodiments of the present disclosure, the magnified game contents may be the game screen in the frame of the telescopic sight, or the game screen within the preset range centering on the crosshair, and even the whole game screen can be magnified. By means of a plurality of magnification manners in different situations, the effect of magnifying and displaying in the telescopic sight can be more flexible, thereby facilitating the observation of the player.

In some embodiments, when the crosshair of the virtual weapon is aimed at an attackable target, the system can control the virtual weapon to automatically shoot, i.e., to achieve the shooting mode of automatic firing. As an example, after the above step S420, the method further may include the following steps.

Step a), controlling the virtual weapon to shoot towards an aiming direction prompted by the crosshair in response to overlap of the crosshair with the target virtual object.

In the above, criterion for determining the overlap of the crosshair with the target virtual object may be based on the size of collision volume of a target virtual object model. For example, like skeleton or "soul" of the model, the collision volume is responsible for recording damage, or producing a physical effect to affect other models. For example, when a bullet hits body of an enemy character, it means that the collision volume of the bullet touches the collision volume of the body of the enemy character. Hence, a virtual physical effect is calculated in the game, which causes the enemy character to be hit and hurt.

Exemplarily, as shown in FIG. 1, when the crosshair 601 in the telescopic sight 603 overlaps with the model body of the target virtual object 504, the system can control the virtual weapon to automatically fire and shoot.

Besides, in the shooting mode of automatic shooting, in order to improve user experience, "aimed" prompt information also may be displayed in the graphical user interface before automatic shooting. For example, when the crosshair overlaps with the target virtual object, the color of the crosshair changes, so as to prompt the player that the aiming has been completed and that the shooting is about to be performed in the current aiming direction.

Figure 8:
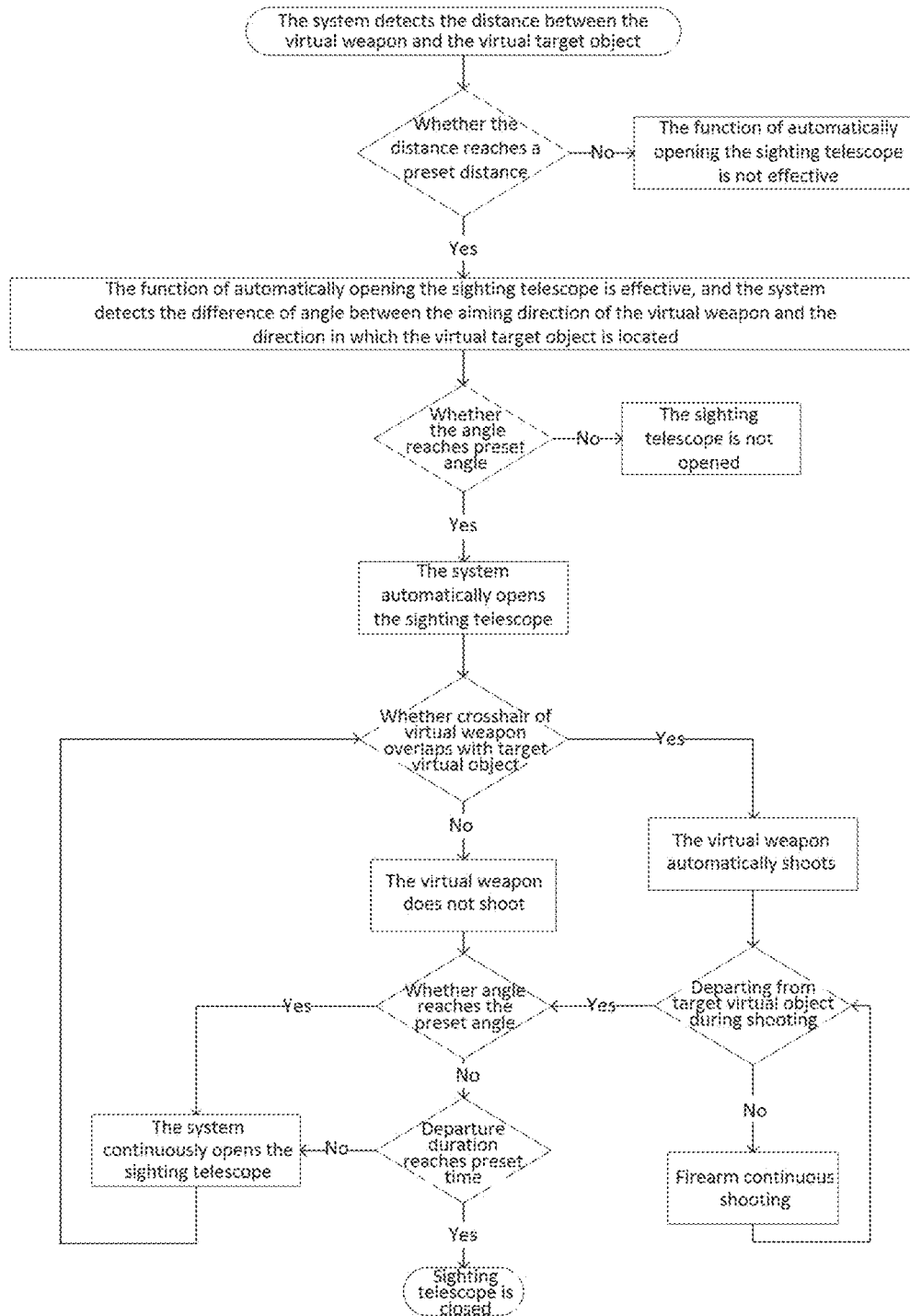
FIG. 8 is a schematic flowchart of system detection provided in one of the embodiments of the present disclosure.

Through the combination of automatically turning on the telescopic sight and the shooting mode of automatic firing, as shown in FIG. 8, when the degree of the included angle between the aiming direction and the direction in which the to-be-attacked target is located is small enough, the telescopic sight is automatically turned on, and automatic shooting is performed when the crosshair overlaps with the virtual object. The player only needs to focus on two operations of moving and aiming, to move the crosshair onto the attackable virtual object, which not only reduces the operation of turning on the telescopic sight, but also reduces the operation of shooting, further improving the gaming experience of the player.

In some embodiments, automatic closing of the telescopic sight also may be controlled according to different situations.

As an example, if the player moves the aiming direction of the virtual weapon away from the direction in which the target virtual object is located until the included angle is larger than the preset angle, i.e., it is separated from the target virtual object, the telescopic sight is automatically turned off. Exemplarily, after the above step S420, the method further may include the following steps:

step b), controlling to close the telescopic sight of the virtual weapon in response to the degree of the included angle being larger than the preset angle.

In one example, as shown in FIG. 8, when the player moves the aiming direction of the virtual weapon so that the aiming direction is far away from the direction in which the target virtual object is located until the degree of the included angle is larger than the preset angle (for example, 5 degrees), i.e., reaches a range out of the telescopic sight, the telescopic sight of the virtual weapon turns off automatically.

For example, when the player wants to shoot an enemy character on the left side, and the aiming direction of the virtual weapon is moved to the left to the direction in which the left enemy character is located, and enters the range of the preset angle for the left enemy character, the telescopic sight of the virtual weapon is automatically turned on. However, at this time, the player obtains information that a more important enemy character appears on the right, that is, of higher attack priority, and this enemy should be attacked first, in this case, the aiming direction of the virtual weapon needs to be moved to the right, and when out of the preset angle for the left enemy character, the telescopic sight can be automatically turned off, which avoids the situation that as the telescopic sight magnifies the game scene proportionally, a moving distance of operation for moving the aiming direction each time is smaller, and the enemy may have escaped when the crosshair is moved to the target position.

By automatically closing the telescopic sight when the included angle between the aiming direction of the virtual weapon and the direction in which the target virtual object is located is larger than the preset angle, the player can rapidly achieve automatic closing of the telescopic sight without the need of manually closing the telescopic sight, thus improving the control operation convenience for the telescopic sight and gaming experience of the player.

As another example, the player may mistakenly move away the virtual weapon, and automatically turning on and closing the telescopic sight frequently may instead easily affect the gaming experience of the player, then in the embodiments of the present disclosure, a function of delayed closing of telescopic sight also may be provided. Exemplarily, after the above step S420, the method further may include the following steps:

step C), starting timing in response to the degree of the included angle being larger than the preset angle; and step d), controlling to close the telescopic sight of the virtual weapon in response to a duration of the timing being greater than or equal to a preset duration.

It should be noted that the preset duration therein may not be limited, for example, 1 second or 2 seconds (in the present embodiment, 1 second is taken as an example for description). As shown in FIG. 8, when the degree of the included angle between the aiming direction of the virtual weapon and the direction in which the target virtual object is located is larger than 5 degrees (the preset angle), it is confirmed that it is preliminarily out of the range of the virtual weapon turning on the telescopic sight. Timing is started from this instant, and if the degree of the included angle between the aiming direction and the direction in which the target virtual object is located is still larger than 5 degrees when it reaches 1 second (the preset duration), the telescopic sight of the virtual weapon is controlled to be turned off in the game scene.

For example, when the player moves the aiming direction of the virtual weapon to the right, as shown in FIG. 6, to be away from the direction in which the target virtual object is located, and when the degree of the included angle is larger than 5 degrees, it is determined that it is preliminarily out of the range of turning on the telescopic sight. At this time, the telescopic sight of the virtual weapon will not be turned off immediately, instead, timing is started from this instant. If the degree of the included angle between the aiming direction of the virtual weapon and the direction in which the target object is located is still larger than 5 degrees after 1 second, that is, the aiming direction of the virtual weapon is still out of the range of turning on the telescopic sight after 1 second, it is confirmed that the virtual weapon is completely out of the range of turning on the telescopic sight, in this case, the system controls the telescopic sight to be automatically turned off.

There are many reasons for the player to move away the aiming direction of the virtual weapon, which may be that the player wants to change a target to-be-attacked object and actively moves the aiming direction away; or that the virtual weapon may be accidentally moved away due to jittering of the virtual weapon caused by recoil force of shooting; or that the virtual weapon may be accidentally moved away due to misoperation of hand slipping of the player. With regard to the latter two unexpected situations of moving away, after the aiming direction is moved away, the player can quickly move it back. If the solution of immediately closing the telescopic sight after the aiming direction of the virtual weapon is out of the range of turning on the telescopic sight is used, the telescopic sight may be turned off and turned on continuously multiple times in a short period of time, which not only makes the player feel uncomfortable visually, but also greatly affects the operation of the player, thus affecting the gaming experience of the player.

By setting the delayed closing of the telescopic sight, when the aiming direction of the virtual weapon is just out of the range of turning on the telescopic sight, the telescopic sight may not be turned off immediately within a preset period of time, and the player is left with a certain reaction time (the preset duration), which can reduce misoperation of the player, and improve the gaming experience of the player.

Besides, in order to improve the user experience, in cases where the timing is started or the telescopic sight is to be automatically turned off, etc., prompt information thereof also may be displayed in the graphical user interface. For example, a countdown icon is displayed when the timing is started, so as to prompt the player time left to automatically close the telescopic sight. For another example, when timing out, a prompt icon for automatically closing the telescopic sight is displayed, so as to prompt the player that the telescopic sight is about to be turned off. For another example, when the player switches a target, i.e., before the telescopic sight is automatically turned off, a prompt icon also may be displayed first, so as to prompt the player that the telescopic sight is to be automatically turned off after switching the target.

Based on the above step c) and step d), if the aiming direction of the virtual weapon returns to the range of turning on the telescopic sight within the foregoing preset period of time, that is, the degree of the included angle is smaller than or equal to the preset angle, the original timing ends. As an example, after the above step c), the method further includes the following step:

step e), ending the timing in response to the degree of the included angle being smaller than or equal to the preset angle.

In practical application, as shown in FIG. 6, when the player moves the aiming direction of the virtual weapon to the right to be away from the direction in which the target virtual object is located, and when the degree of the included angle is larger than 5 degrees (the preset angle), i.e., it is out of the range of turning on the telescopic sight, the telescopic sight of the virtual weapon will not be immediately turned off, instead, timing is started from this instant, and if the aiming direction of the virtual weapon returns into the range of turning on the telescopic sight within 1 second (the preset duration), the telescopic sight of the virtual weapon will not be turned off, and the timing task ends.

In one embodiment, after the timing ends, the counted time can be reset. For example, the player moves the aiming direction back into the range of turning on the telescopic sight when the aiming direction of the virtual weapon is out of the range of turning on the telescopic sight by 0.5 seconds, then, the timing ends, the counted 0.5 seconds will be reset, and when the aiming direction of the virtual weapon is out of the range of turning on the telescopic sight again next time, the timing is started again from 0 seconds, and then compared with the preset time, so that the system determines whether to close the telescopic sight.

The delayed closing of the telescopic sight is set, the time of timing can be reset when the aiming direction of the virtual weapon returns into the range of turning on the telescopic sight, and the timing is restarted from the next time, thus avoiding the situation that closing the telescopic sight due to abnormal deviation from the aiming affects the gaming experience of the player, and improving the fault tolerance.

In some embodiments, the function of automatically turning on the telescopic sight is triggered only when the distance between the virtual weapon and the target virtual object is relatively long, i.e., whether to activate the function of automatically turning on the telescopic sight is judged according to the distance between the virtual weapon and the target virtual object. As an example, the above step S420 further may specifically include the following steps:

step f1), detecting the degree of the included angle between the aiming direction and the direction in which the target virtual object is located in response to the target virtual object appearing in the graphical user interface;

step f2), detecting the distance between the virtual weapon and the target virtual object in response to the degree of the included angle between the aiming direction and the direction in which the target virtual object is located being smaller than or equal to the preset angle, and step f3), performing the step of controlling to turn on the telescopic sight of the virtual weapon when the distance is larger than or equal to the preset distance.

Figure 9:
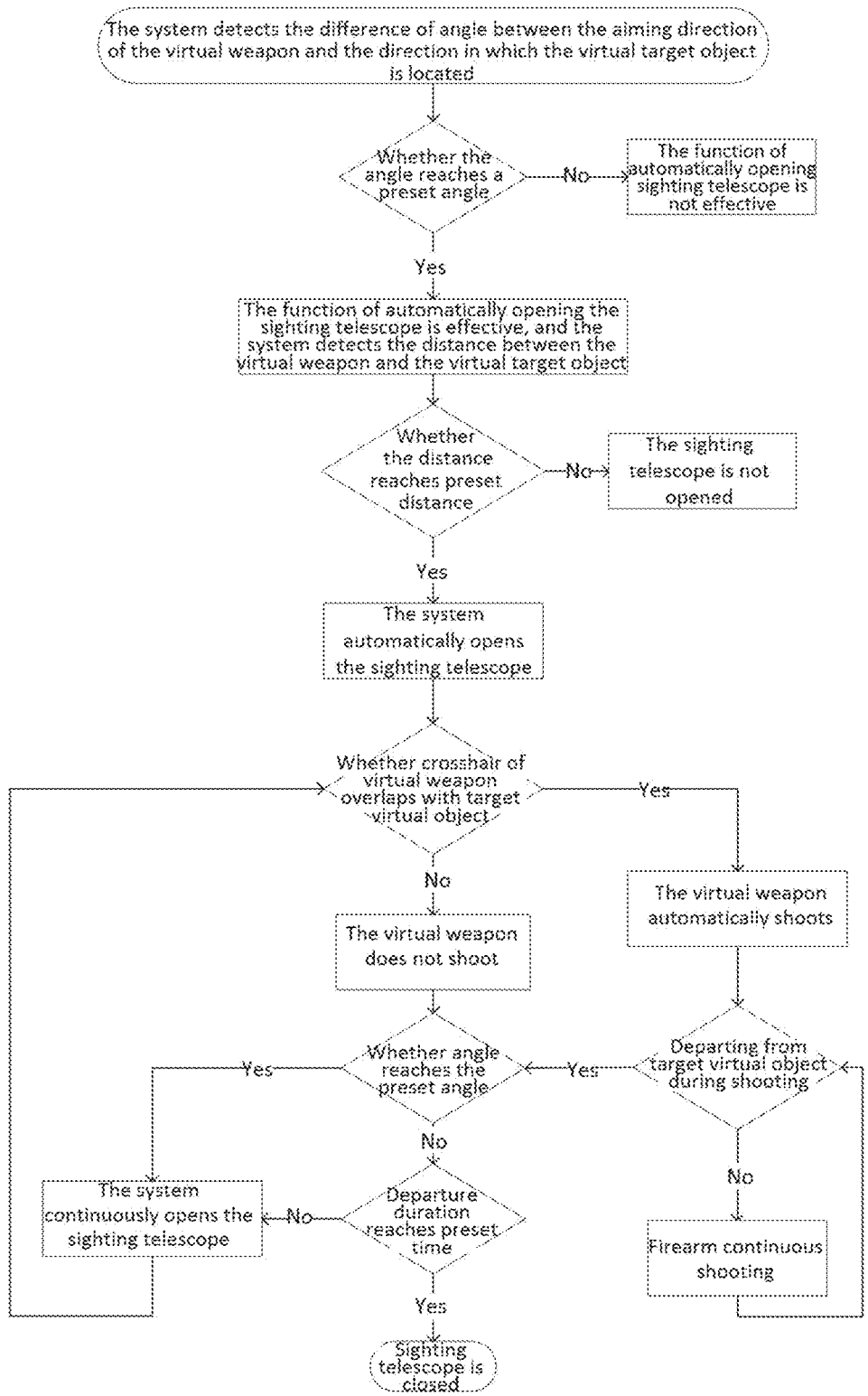
FIG. 9 is a schematic flowchart of another system detection provided in one of the embodiments of the present disclosure.

It should be noted that the preset distance therein may not be limited, for example, 10 meters or 50 meters (in the present embodiment, 10 meters is taken as an example for description). As shown in FIG. 9, after it is detected that the degree of the included angle between the aiming direction and the direction in which the target virtual object is located is smaller than the preset angle, the distance between the virtual weapon and the target virtual object is detected; when the distance between the virtual weapon and the target virtual object is larger than 10 meters (the preset distance), the system responds to confirm that it enters the distance for automatically turning on the telescopic sight, and the telescopic sight of the virtual weapon is automatically turned on; and when the distance between the virtual weapon and the target virtual object is smaller than or equal to 10 meters, the function of automatically turning on the telescopic sight may not respond.

By combining the two triggering conditions of turning on the telescopic sight, i.e., the distance condition between the virtual weapon and the target virtual object, and the degree of the included angle between the aiming direction and the direction in which the target virtual object is located, it is added whether the function of automatically turning on the telescopic sight is activated is judged by setting the preset distance, and the use range of the function of automatically turning on the telescopic sight is limited, i.e., this function is only activated at a distance, which avoids the situation that the telescopic sight is still automatically turned on when the enemy just appears at a closer distance in the game, thereby making it difficult to aim, thus improving the player's gaming experience.

In some embodiments, the system can firstly detect the distance between the virtual weapon and the target virtual object, and then, when being within a preset distance range, detect the degree of the included angle between the aiming direction of the virtual weapon and the direction in which the target virtual object is located. As an example, before the above step S420, the method further may include the following steps:

step g), detecting the distance between the virtual weapon and the target virtual object in the game scene in response to the target virtual object appearing in the graphical user interface; and step h), detecting the angle between the aiming direction and the direction in which the target virtual object is located in response to determining that the distance between the virtual weapon and the target virtual object meets a preset distance requirement, such as the distance between the virtual weapon and the target virtual object being larger than or equal to the preset distance.

In one embodiment, an overall detection process may be as shown in FIG. 8, and before detecting the degree of the included angle between the aiming direction of the virtual weapon and the direction in which the target virtual object is located, detecting the distance between the virtual weapon and the target virtual object first can ensure correct use range of the telescopic sight, and good running of the whole function of automatically turning on the telescopic sight.

Based on the above step h), the degree of the included angle between the aiming direction of the virtual weapon and the direction in which the target virtual object is located may be detected in multiple manners. As an example, the above step h) may include the following steps:

step i), emitting a detection ray from a position of the virtual weapon towards the direction in which the target virtual object is located; and step j), calculating the degree of the included angle between the aiming direction and the detection ray, and determining the degree of the included angle as the degree of the included angle between the aiming direction and the direction in which the target virtual object is located.

Figure 10:
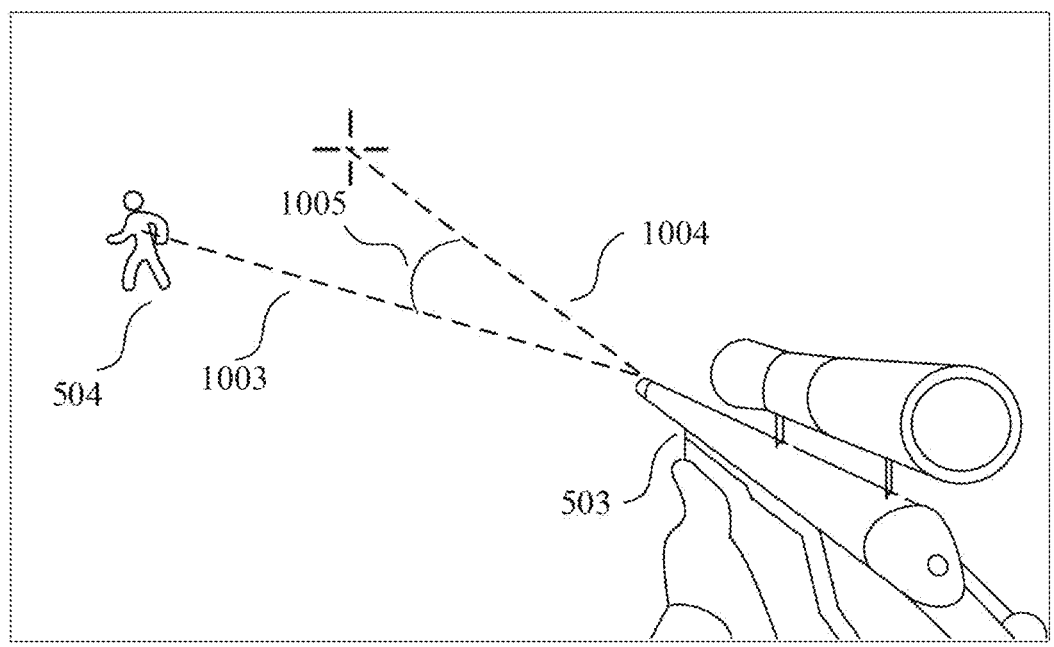
FIG. 10 is a schematic view of another electronic terminal displaying the graphical user interface provided in one of the embodiments of the present disclosure.

In one example, as shown in FIG. 10, a detection ray 1003 is emitted from the position of the virtual weapon 503 towards the direction of the target virtual object 504, and a ray in the aiming direction of the virtual weapon is an aiming ray 1004. The system calculates the angle between the aiming ray and the detection ray, and determines the degree of the included angle as the degree of the included angle 1005 between the aiming direction of the virtual weapon and the direction in which the target virtual object is located, so as to judge whether to activate the telescopic sight using this degree of the included angle 1005.

It should be noted that, the above judgment position of the virtual weapon in the game may be located at the center of the game screen, but not necessarily a rightward position shown by the weapon model in the game screen, and the above detection ray and aiming ray are both virtual rays that may be invisible in the game.

The degree of the included angle between the aiming direction of the virtual weapon and the direction in which the target virtual object is located can be precisely and effectively calculated by means of emitting the detection ray, so that whether to activate the telescopic sight can be more precisely judged.

In some embodiments, there may be a plurality of specific operation manners for the aiming operation of the virtual weapon. As an example, the adjustment operation on the crosshair includes any one or more of the following:

a sliding operation on the crosshair, a sliding operation on an aiming control, and a sliding operation on a preset area in the graphical user interface.

For the crosshair in the embodiments of the present disclosure, it should be noted that a display position of the crosshair may be a central position of display screen in general shooting games, and the player can adjust the aiming direction by controlling movement of a visual angle direction of his/her own virtual character, i.e., a visual angle direction of character.

In one embodiment, the player can control the aiming direction of the virtual weapon by a sliding operation on the crosshair, for example, the finger of the player slides on the position of the crosshair in the graphical user interface, and the crosshair can move along with a touch control point of the finger of the player on the graphical user interface.

In one embodiment, the player can control the aiming direction of the virtual weapon by a sliding operation on the aiming control, for example, the player can control an aiming joystick on the screen, and the crosshair of the virtual weapon can move according to the aiming joystick.

In one embodiment, the player can control the aiming direction of the virtual weapon by means of a sliding operation on a preset area in the graphical user interface, for example, left half of the screen is the preset area, and the player can control the aiming direction of the virtual weapon by sliding finger on the left half area of the screen.

Different modes of aiming operations on the virtual weapon can be adopted according to different games and game habits of different players, so that the aiming operations of the virtual weapon can be more flexible, thus improving the gaming experience.

In some embodiments, the function of automatically turning on the telescopic sight can be simultaneously combined with the function of manually turning on the telescopic sight, without affecting the player to manually turn on the telescopic sight at the same time. As an example, a telescopic sight control for the virtual weapon is provided in the graphical user interface; and the method also may include the following steps:

step k), in response to the operation on the telescopic sight control, controlling to turn on the telescopic sight of the virtual weapon, and magnifying and displaying the game contents determined through the telescopic sight.

For example, when the player wants to aim a target virtual object within meters (the preset distance) with the telescopic sight, as the system does not activate the automatic aiming function within the preset distance, the player also can manually manipulate to turn on the telescopic sight. For another example, if the target virtual object is too far away, and the system does not detect a target virtual object at that position, the player also can manually manipulate to turn on the telescopic sight. For another example, there is no target virtual object in the game screen, but the player wants to observe distant buildings or terrains, so as to make a next game strategy, the player also can manually manipulate to turn on the telescopic sight.

By combining the function of automatically turning on the telescopic sight with the function of manually turning on the telescopic sight, i.e., also providing the telescopic sight control for the virtual weapon in the graphical user interface, the operability of the player is higher, the game playability is higher, and the gaming experience is improved.

In some embodiments, it is feasible that the triggering condition for automatically turning on the telescopic sight is not the degree of the included angle between the aiming direction and the direction in which the target virtual object is located, but rather the distance between the virtual weapon and the target virtual object. As an example, the above step S420 may be substituted by the following steps:

step m), detecting the distance between the virtual weapon and the target virtual object; and step n), controlling to turn on the telescopic sight of the virtual weapon when the distance is larger than or equal to the preset distance.

It should be noted that the preset distance therein may not be limited, for example, may be 10 meters or 50 meters. Exemplarily, when it is detected that the distance between the virtual weapon and the target virtual object is greater than 10 meters (the preset distance), the system responds to confirm that it enters the distance for automatically turning on the telescopic sight, and the telescopic sight of the virtual weapon is automatically turned on; and when it is detected that the distance between the virtual weapon and the target virtual object is smaller than or equal to 10 meters, the function of automatically turning on the telescopic sight may not respond.

By setting the preset distance to judge whether the function of automatically turning on the telescopic sight is activated, the use range of the function of automatically turning on the telescopic sight is limited, i.e., this function is only activated at a distance, which avoids the situation where the telescopic sight is still automatically turned on when the enemy just appears at a closer distance in the game, thereby making it difficult to aim, thus improving the player's gaming experience.

Figure 11:
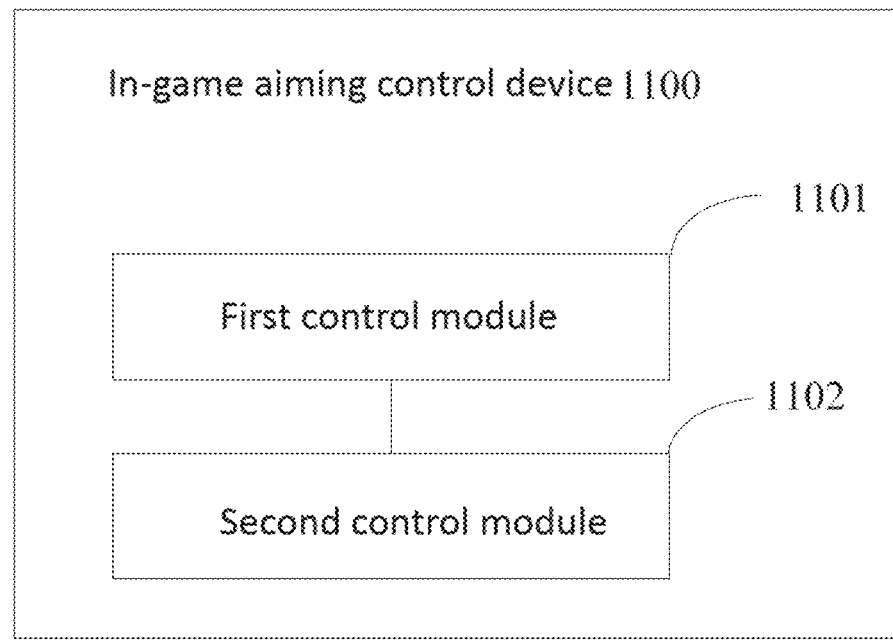
FIG. 11 is a structural schematic view of an in-game aiming control device provided in one of the embodiments of the present disclosure.

FIG. 11 provides a structural schematic view of an in-game aiming control device, where the device can be applied to a terminal that can present a graphical user interface, the graphical user interface is provided by the terminal, and at least a crosshair of a virtual weapon and a target virtual object located in a game scene of a game are displayed in the graphical user interface, where the crosshair is configured to prompt an aiming direction of the virtual weapon in the game scene. As shown in FIG. 11, the in-game aiming control device includes:

a first control module 1101, configured to control to adjust the aiming direction of the virtual weapon in the game scene in response to an adjustment operation on the crosshair; and a second control module 1102, configured to, in response to a degree of an included angle between the aiming direction and a direction in which the target virtual object is located being smaller than or equal to a preset angle, control to turn on the telescopic sight of the virtual weapon, and magnify and display game contents determined through the telescopic sight.

In some embodiments, the game contents determined through the telescopic sight include any one of the following:

a game screen in a mirror frame of the telescopic sight, a game screen within a preset range centering on the crosshair, and the whole game screen of the game.

In some embodiments, the device further includes:

a third control module, configured to control the virtual weapon to shoot towards an aiming direction prompted by the crosshair in response to overlap of the crosshair with the target virtual object after the telescopic sight of the virtual weapon is controlled to be turned on.

In some embodiments, the device further includes:

a timing module, configured to start timing in response to the degree of the included angle being larger than the preset angle after the telescopic sight of the virtual weapon is controlled to be turned on; and a fourth control module, configured to control to close the telescopic sight of the virtual weapon in response to a duration of the timing being greater than or equal to a preset duration.

In some embodiments, the device further includes:

an ending module, configured to end the timing in response to the degree of the included angle being smaller than or equal to the preset angle after the timing is started.

In some embodiments, the device further includes:

a fifth control module, configured to control to close the telescopic sight of the virtual weapon in response to the degree of the included angle being larger than the preset angle after the telescopic sight of the virtual weapon is controlled to be turned on in response to the degree of the included angle between the aiming direction and the direction in which the target virtual object is located being smaller than or equal to a preset angle.

In some embodiments, the device further includes:

a first detection module, configured to, after responding to the degree of the included angle between the aiming direction and the direction in which the target virtual object is located being smaller than or equal to the preset angle, and before controlling to turn on the telescopic sight of the virtual weapon, detect a distance between the virtual weapon and the target virtual object; and perform the step of controlling to turn on the telescopic sight of the virtual weapon when the distance is larger than or equal to a preset distance.

In some embodiments, the device further includes:

a second detection module, configured to detect the distance between the virtual weapon and the target virtual object in the game scene in response to the target virtual object appearing in the graphical user interface, before controlling to turn on the telescopic sight of the virtual weapon in response to the degree of the included angle between the aiming direction and the direction in which the target virtual object is located being smaller than or equal to the preset angle; and a third detection module, configured to detect the degree of the included angle between the aiming direction and the direction in which the target virtual object is located in response to the distance between the virtual weapon and the target virtual object being greater than or equal to the preset distance.

In some embodiments, the third detection module is specifically configured to:

emit a detection ray from a position of the virtual weapon towards the direction in which the target virtual object is located; and calculate the degree of the included angle between the aiming direction and the detection ray, and determining the degree of the included angle as the degree of the included angle between the aiming direction and the direction in which the target virtual object is located.

In some embodiments, the adjustment operation on the crosshair includes any one or more of the following:

a sliding operation on the crosshair, a sliding operation on an aiming control, and a sliding operation on a preset area in the graphical user interface.

In some embodiments, the graphical user interface is provided therein with a telescopic sight control for the virtual weapon; and the device further includes:

a sixth control module, configured to, in response to an operation on the telescopic sight control, control to turn on the telescopic sight of the virtual weapon, and magnify and display the game contents determined through the telescopic sight.

In some embodiments, the above second control module 1102 further may be configured to:

detect the distance between the virtual weapon and the target virtual object; and control to turn on the telescopic sight of the virtual weapon when the distance is larger than or equal to a preset distance.

The in-game aiming control device provided in the embodiments of the present disclosure have the same technical features as the in-game aiming control method provided in the above embodiments, and thus also may solve the same technical problem, and achieve the same technical effects.

Corresponding to the above in-game aiming control method, an embodiment of the present disclosure further provides a non-transitory computer-readable storage medium, where the non-transitory computer-readable storage medium stores machine-executable instructions, when the computer-executable instructions are invoked and executed by a processor, the computer-executable instructions cause the processor to execute the steps of the above in-game aiming control method, for example:

controlling to adjust the aiming direction of the virtual weapon in the game scene in response to an adjustment operation on a crosshair; and in response to a degree of an included angle between the aiming direction and a direction in which the target virtual object is located being smaller than or equal to a preset angle, controlling to turn on the telescopic sight of the virtual weapon, and magnifying and displaying game contents determined through the telescopic sight.

In some examples, the game contents determined through the telescopic sight include any one of the following:

a game screen in a mirror frame of the telescopic sight, a game screen within a preset range centering on the crosshair, and a whole game screen of the game.

In some examples, after the step of controlling to turn on the telescopic sight of the virtual weapon, further included is:

controlling the virtual weapon to shoot towards an aiming direction prompted by the crosshair in response to overlap of the crosshair with the target virtual object.

In some examples, after the step of controlling to turn on the telescopic sight of the virtual weapon, further included is:
- starting timing in response to the degree of the included angle being larger than the preset angle; and
- controlling to close the telescopic sight of the virtual weapon in response to a duration of the timing being greater than or equal to a preset duration.

In some examples, after the step of starting timing, further included is:
- ending the timing in response to the degree of the included angle being smaller than or equal to the preset angle.

In some examples, after the step of, in response to a degree of an included angle between the aiming direction and a direction in which the target virtual object is located being smaller than or equal to a preset angle, controlling to turn on the telescopic sight of the virtual weapon, further included is:
- controlling to close the telescopic sight of the virtual weapon in response to the degree of the included angle being larger than the preset angle.

In some examples, after responding to the degree of the included angle between the aiming direction and the direction in which the target virtual object is located being smaller than or equal to the preset angle, and before controlling to turn on the telescopic sight of the virtual weapon, further included is:
- detecting the distance between the virtual weapon and the target virtual object; and
- performing the step of controlling to turning on the telescopic sight of the virtual weapon when the distance is larger than or equal to the preset distance.

In some examples, before the step of, in response to a degree of an included angle between the aiming direction and a direction in which the target virtual object is located being smaller than or equal to a preset angle, controlling to turn on the telescopic sight of the virtual weapon, further included is:
- detecting the distance between the virtual weapon and the target virtual object in the game scene in response to the target virtual object appearing in the graphical user interface; and
- detecting the angle between the aiming direction and the direction in which the target virtual object is located in response to determining that the distance between the virtual weapon and the target virtual object meets a preset distance requirement, such as the distance between the virtual weapon and the target virtual object being larger than or equal to the preset distance.

In some examples, the step of detecting the degree of the included angle between the aiming direction and the direction in which the target virtual object is located includes:
- emitting a detection ray from a position of the virtual weapon towards the direction in which the target virtual object is located; and
- calculating the degree of the included angle between the aiming direction and the detection ray, and determining the degree of the included angle as the degree of the included angle between the aiming direction and the direction in which the target virtual object is located.

In some examples, the adjustment operation on the crosshair includes any one or more of the following:
- a sliding operation on the crosshair, a sliding operation on an aiming control, and a sliding operation on a preset area in the graphical user interface.

In some examples, the graphical user interface is provided therein with a telescopic sight control for the virtual weapon; and the method further includes:
- in response to an operation on the telescopic sight control, controlling to turn on the telescopic sight of the virtual weapon, and magnifying and displaying the game contents determined through the telescopic sight.

In some examples, the step of, in response to a degree of an included angle between the aiming direction and a direction in which the target virtual object is located being smaller than or equal to a preset angle, controlling to turn on the telescopic sight of the virtual weapon, can be substituted by:
- detecting a distance between the virtual weapon and the target virtual object; and
- controlling to turn on the telescopic sight of the virtual weapon when the distance is larger than or equal to a preset distance.

In the above modes, by automatically turning on the telescopic sight when the degree of the included angle between the aiming direction and the direction in which the to-be-attacked target is located is small enough, the player performs more precise observation and aiming judgment by means of the magnification function of the telescopic sight, and no additional operations of the player are required, which is realized that the operation burden of the player can be reduced while satisfying precise aiming judgment, and the technical problem of relatively large cost for the player to perform the precise aiming operation in the game may be solved.

The in-game aiming control device provided in the embodiments of the present disclosure may be specific hardware on an apparatus or software, firmware or the like installed on an apparatus. The implementation principles and generated technical effects of the device provided in the embodiments of the present disclosure are the same as those of the foregoing method embodiments, and for brief description, the parts not mentioned in the device embodiments can refer to the corresponding contents in the foregoing method embodiments. Those skilled in the art could clearly understand that, for the convenience and brevity of the description, the specific working processes of the systems, devices, and units described above can all refer to the corresponding processes in the above-mentioned method embodiments, which will not be repeated here.

In the embodiments provided in the present disclosure, it should be understood that the device and the method disclosed may be implemented in other manners. The device embodiments described in the above are merely exemplary, for example, the units are merely divided according to logical functions, but they may be divided in other manners in practical implementation, for another example, multiple units or components may be combined or may be integrated into another system, or some features may be omitted, or not executed. In addition, the mutual coupling, or direct coupling or communication connection illustrated or discussed may be implemented via indirect coupling or communication connection between some communication interfaces, apparatuses, or units, which may be electronic, mechanical, or in other forms.

For another example, the flowcharts and the block diagrams in the drawings illustrate possible system architectures, functions, and operations of the device, method, and computer program products according to multiple embodiments of the present disclosure. In this regard, each block in the flowchart or the block diagram may represent one module, program segment, or a part of code, and the module, the program segment, or the part of the code contains one or more executable instructions configured to achieve a specified logical function. It also should be noted that in some embodiments as substitution, the functions indicated in the blocks also may be proceeded in an order different from that indicated in the drawings. For example, two continuous blocks practically may be executed substantially in parallel, and they sometimes also may be executed in a reverse order, which depends upon the functions involved. It also should be noted that each block in the block diagram and/or the flowchart, and combinations of the blocks in the block diagram and/or the flowchart can be realized by a dedicated hardware-based system configured to execute a specified function or action, or can be realized by a combination of dedicated hardware and computer instructions.

The said units described as separate parts may be or also may not be physically separated, the parts displayed as units may be or also may not be physical units, i.e., they may be located at one place, or also may be distributed on a plurality of network units. The objective of the solution of the present embodiment may be realized by selecting part or all of the units thereof as actually required.

Besides, various functional units in the embodiments provided in the present disclosure may be integrated into one processing unit, or each unit also may exist in a physically independent way, or two or more than two units also may be integrated into one unit.

The functions, if implemented in the form of software functional units and sold or used as an independent product, may be stored in a non-transitory computer-readable storage medium. Based on this understanding, the technical solutions of the present disclosure in essence, or the parts that make contributions to the related art or the parts of the technical solutions can be embodied in the form of software products. The computer software products are stored in a storage medium, which includes that several instructions are used to cause a computer device (which may be a personal computer, a server, or a network device, etc.) to execute all or part of the steps of the in-game aiming control method described in the various embodiments of the present disclosure. The aforementioned storage medium includes various media in which program codes can be stored, such as U disk, mobile hard disk, read-only memory (ROM), random access memory (RAM), diskette and compact disk.

It should be noted that similar reference signs and letters represent similar items in the following drawings, therefore, once a certain item is defined in one drawing, it is not needed to be further defined or explained in subsequent drawings. Besides, the terms "first", "second", "third", etc. are only used to distinguish the description and should not be construed as indicating or implying importance in relativity.

Finally, it should be noted that the above-mentioned embodiments are only specific embodiments of the present disclosure, and are used to illustrate the technical solutions of the present disclosure, but not to limit them. The protection scope of the present disclosure is not limited to this, although the present disclosure has been described in detail with reference to the foregoing embodiments, those ordinarily skilled in the art should understand that any person skilled in the art who is familiar with the technical field could still make modifications to the technical solutions described in the foregoing embodiments, could easily think of changes, or perform equivalent replacements to some of the technical features, within the technical scope disclosed in the present disclosure; however, these modifications, changes or substitutions do not cause the essence of the corresponding technical solutions to deviate from the scope of the technical solutions of the embodiments in the present disclosure. They all should be covered within the scope of protection of the present disclosure. Therefore, the scope of protection of the present disclosure should be determined by the scope of protection of the claims.

What is claimed is:

1. An in-game aiming control method, comprising:
   in response to detecting an adjustment operation on a crosshair of a virtual weapon, adjusting an aiming direction of the virtual weapon in a game scene, wherein a graphical user interface is provided by a terminal, the graphical user interface displays the crosshair of the virtual weapon and a target virtual object located in the game scene, and the crosshair is configured to prompt the aiming direction of the virtual weapon in the game scene; and
   in response to determining that an angle between the aiming direction and a direction in which the target virtual object is located is smaller than or equal to a preset angle, turning on a telescopic sight of the virtual weapon and magnifying and displaying game contents determined through the telescopic sight.

2. The method according to claim 1, wherein the game contents determined through the telescopic sight comprise at least one of following content:
   a game screen in a mirror frame of the telescopic sight, a game screen within a preset range centering on the crosshair, or a whole game screen of the game.

3. The method according to claim 1, wherein the method further comprises:
   in response to determining that the crosshair overlaps with the target virtual object, controlling the virtual weapon to shoot towards an aiming direction prompted by the crosshair.

4. The method according to claim 1, wherein the method further comprises:
   starting timing in response to determining that the angle is larger than the preset angle; and
   turning off the telescopic sight of the virtual weapon in response to determining that a duration of the timing is greater than or equal to a preset duration.

5. The method according to claim 4, wherein the method further comprises:
   ending the timing in response to determining that the angle is smaller than or equal to the preset angle.

6. The method according to claim 1, wherein the method further comprises:
   turning off the telescopic sight of the virtual weapon in response to determining that the angle is larger than the preset angle.

7. The method according to claim 1, wherein the method further comprises:
   detecting a distance between the virtual weapon and the target virtual object; and
   turning on the telescopic sight of the virtual weapon in response to determining that the distance is larger than or equal to a preset distance.

8. The method according to claim 1, wherein the method further comprises:
   in response to detecting that the target virtual object appears in the graphical user interface, determining a distance between the virtual weapon and the target virtual object in the game scene; and
   in response to determining that the distance between the virtual weapon and the target virtual object meets a preset distance requirement, detecting the angle between the aiming direction and the direction in which the target virtual object is located.

9. The method according to claim 1, wherein determining the angle between the aiming direction and the direction in which the target virtual object is located further comprises:
calculating a degree of an angle between the aiming direction and a detection ray, and determining the degree of the angle as the angle between the aiming direction and the direction in which the target virtual object is located, wherein the detection ray is emitted from a position of the virtual weapon towards the direction in which the target virtual object is located.

10. The method according to claim 1, wherein the adjustment operation on the crosshair comprises at least one of following content:
a sliding operation on the crosshair, a sliding operation on an aiming control, or a sliding operation on a preset area in the graphical user interface.

11. The method according to claim 1, wherein the graphical user interface comprises a telescopic sight control for the virtual weapon; and the method further comprises:
turning on the telescopic sight of the virtual weapon in response to an operation on the telescopic sight control, and magnifying and displaying the game contents determined through the telescopic sight.

12. An electronic terminal, comprising a display screen, a memory and a processor, the memory storing instructions executable by the processor, wherein the display screen is configured to display a graphical user interface, and wherein the processor is configured to:
in response to detecting an adjustment operation on a crosshair of a virtual weapon, adjust an aiming direction of the virtual weapon in a game scene, wherein the graphical user interface displays the crosshair of the virtual weapon and a target virtual object located in the game scene, and the crosshair is configured to prompt the aiming direction of the virtual weapon in the game scene; and
in response to determining that an angle between the aiming direction and a direction in which the target virtual object is located is smaller than or equal to a preset angle, turn on a telescopic sight of the virtual weapon, and magnify and display game contents determined through the telescopic sight.

13. A non-transitory computer-readable storage medium, wherein the non-transitory computer-readable storage medium stores computer-executable instructions, when the computer-executable instructions are invoked and executed by a processor, the computer-executable instructions cause the processor to execute an in-game aiming control method, comprising:
in response to detecting an adjustment operation on a crosshair of a virtual weapon, adjusting an aiming direction of the virtual weapon in a game scene, wherein a graphical user interface is provided by a terminal, the graphical user interface displays the crosshair of the virtual weapon and a target virtual object located in the game scene, and the crosshair is configured to prompt the aiming direction of the virtual weapon in the game scene; and
in response to determining that an angle between the aiming direction and a direction in which the target virtual object is located is smaller than or equal to a preset angle, turning on a telescopic sight of the virtual weapon, and magnifying and displaying game contents determined through the telescopic sight.

14. The method according to claim 1, wherein the virtual weapon comprises a virtual slingshot, a virtual pistol, a virtual rifle, and a virtual sniper rifle with the telescopic sight.

15. The method according to claim 1, wherein the target virtual object comprises a static article, a dynamic article, and other virtual characters in the game scene.

16. The non-transitory computer-readable storage medium according to claim 13, wherein the game contents determined through the telescopic sight comprise at least one of following content:
a game screen in a mirror frame of the telescopic sight, a game screen within a preset range centering on the crosshair, or a whole game screen of the game.

17. The non-transitory computer-readable storage medium according to claim 13, wherein the method further comprises:
in response to determining that the crosshair overlaps with the target virtual object, controlling the virtual weapon to shoot towards an aiming direction prompted by the crosshair.

18. The non-transitory computer-readable storage medium according to claim 13, wherein the method further comprises:
starting timing in response to determining that the angle is larger than the preset angle; and
turning off the telescopic sight of the virtual weapon in response to determining that a duration of the timing is greater than or equal to a preset duration.

19. The non-transitory computer-readable storage medium according to claim 18, wherein the method further comprises:
ending the timing in response to determining that the angle is smaller than or equal to the preset angle.

* * * * *